(12) United States Patent
Tokarz et al.

(10) Patent No.: US 8,568,565 B2
(45) Date of Patent: Oct. 29, 2013

(54) SILICA-BASED SOLS

(75) Inventors: Marek Tokarz, Göteborg (SE);
Hans-Åke Baltsen, Varberg (SE)

(73) Assignee: Akzo Nobel N.V., Arnhem (NL)

( * ) Notice: Subject to any disclaimer, the term of this patent is extended or adjusted under 35 U.S.C. 154(b) by 147 days.

(21) Appl. No.: 13/054,219

(22) PCT Filed: Jul. 10, 2009

(86) PCT No.: PCT/EP2009/058787
§ 371 (c)(1),
(2), (4) Date: Jan. 14, 2011

(87) PCT Pub. No.: WO2010/006994
PCT Pub. Date: Jan. 21, 2010

(65) Prior Publication Data
US 2011/0247774 A1    Oct. 13, 2011

Related U.S. Application Data

(60) Provisional application No. 61/080,330, filed on Jul. 14, 2008.

(30) Foreign Application Priority Data

Jul. 14, 2008    (EP) ..................... 08160323

(51) Int. Cl.
*D21H 17/68*    (2006.01)
*D21H 21/10*    (2006.01)
*C01B 33/14*    (2006.01)

(52) U.S. Cl.
USPC .................. 162/181.6; 516/81; 162/183

(58) Field of Classification Search
USPC ............ 162/181.1, 181.6, 181.7, 183; 516/81,
516/79, 80, 82; 423/335; 106/287.34
See application file for complete search history.

(56) References Cited

U.S. PATENT DOCUMENTS

| | | |
|---|---|---|
| 3,668,088 A | 6/1972 | Iler |
| 4,124,471 A | 11/1978 | Lieb et al. |
| 5,176,891 A | 1/1993 | Rushmere |
| 5,368,833 A | 11/1994 | Johansson et al. |
| 5,603,805 A | 2/1997 | Andersson et al. |
| 6,372,806 B1 | 4/2002 | Keiser et al. |

FOREIGN PATENT DOCUMENTS

| | | |
|---|---|---|
| EP | 0 107 142 | 5/1984 |
| RU | 2213053 | 9/2003 |
| RU | 2309119 | 6/2007 |
| WO | 98/30753 | 7/1998 |
| WO | 98/56715 | 12/1998 |
| WO | 00/66491 | 11/2000 |
| WO | 00/66492 | 11/2000 |
| WO | 00/75074 | 12/2000 |
| WO | 02/051748 | 7/2002 |
| WO | 2005/097678 | 10/2005 |
| WO | 2005/100241 | 10/2005 |

OTHER PUBLICATIONS

Alexander et al., "The Solubility of Amorphous Silica in Water", J. Phys. Chem., Jun. 1954, 58 (6), pp. 453-455.*
Brykov, A. S., "Formation of Concentrated Polysilicate Solutions from Stabilized Silica Sols", Colloid Journal, 2004, vol. 66, No. 4, pp. 430-434.
Mullin, J. B., et al., "The Colorimetric Determination of Silicate with Special Reference to Sea and Natural Waters", Analytica Chimica Acta, 1955, vol. 12, pp. 162-176.
Iler, R. K., et al., "Degree of Hydration of Particles of Colloidal Silica in Aqueous Solution", J. Phys. Chem., Jul. 1956, vol. 60, pp. 955-957.
Sears, George, "Determination of Specific Surface Area of Colloidal Silica by Titration with Sodium Hydroxide", Analytical Chemistry, Dec. 1956, vol. 28, No. 12, pp. 1981-1983.
European Search Report for 08160323.5, dated Jan. 27, 2009, 7 pages.
International Search Report and Written Opinion for PCT/EP2009/058787, dated Sep. 24, 2009, 15 pages.
Russian Office Action, as issued in corresponding Russian Application No. 2011105143/5(007279), undated.

* cited by examiner

Primary Examiner — Eric Hug
(74) Attorney, Agent, or Firm — Kenyon & Kenyon LLP

(57) ABSTRACT

The present invention relates to a silica-based sol having a concentration of soluble silica of less than about 1000 mg $SiO_2$/l, conductivity of at least about 2.0 mS/cm and S-value below about 50%. The invention further relates to a method of producing a silica-based sol comprising subjecting an aqueous alkali metal silicate solution to electrodialysis to form an electrodialyzed sol, and acidifying the electrodialyzed sol to form an acidified sol having a pH in the range of from about 5.0 to about 10. The invention further relates to silica-based sol obtainable by the process and to the use of the silica-based sol as a flocculating agent. The invention further relates to a process for producing paper which comprises providing an aqueous suspension comprising cellulosic fibers, adding to the suspension one or more drainage and retention aids comprising a silica-based sol according to the invention, and dewatering the obtained suspension to provide a sheet or web of paper.

15 Claims, No Drawings

SILICA-BASED SOLS

REFERENCE TO RELATED APPLICATION(s)

This application is the U.S. National Phase of PCT/EP2009058787 filed on Jul. 10, 2009, and claims the benefit of U.S. Provisional Application No. 61/080,330 filed on Jul. 14, 2008.

FIELD OF THE INVENTION

The present invention relates to silica-based sols and their production and use. The present invention provides silica-based sols with improved drainage and retention performance in papermaking.

BACKGROUND OF THE INVENTION

In the papermaking art, an aqueous suspension containing cellulosic fibers, and optional fillers and additives, is fed into a headbox which ejects the cellulosic suspension onto a forming wire. Water is drained from the cellulosic suspension to provide a wet paper web which is further dewatered and dried in the drying section of the paper machine. Drainage and retention aids are conventionally introduced into the cellulosic suspension to facilitate drainage and increase adsorption of fine particles onto the cellulosic fibers so that they are retained with the fibers.

Silica-based sols are widely used as drainage and retention aids, usually in combination with charged organic polymers. Such additive systems are among the most efficient now in use in the papermaking industry, in particular those comprising silica-based sols which contain microgel or aggregated particles of high surface areas. Examples of silica-based sols of this type include those disclosed in U.S. Pat. Nos. 5,176,891; 5,368,833; 5,603,805 and 6,372,806 as well as International Patent Appl'n Publ. Nos. WO 98/30763; 98/56715; 00166491; 00/66492; 2005/097678 and 2005/100241.

Silica-based sols are usually shipped and stored in the form of high concentration sols. Prior to addition to the cellulosic suspension, the sols are usually diluted with water in order to improve mixing of the silica-based particles with the furnish components of the cellulosic suspension. However, depending on its origin, the dilution water used may be hard water or otherwise contain a substantial amount of salts, electrolytes, etc. which usually will affect the performance of the sols.

It would be advantageous to be able to provide silica-based sols with improved drainage and retention performance in papermaking, in particular when the sols have been diluted with hard water or dilution water containing a substantial amount of salts and electrolytes. It would also be advantageous to be able to provide a method for producing such silica-based sols. It would also be advantageous to be able to provide a papermaking process with improved drainage and retention performance.

SUMMARY OF THE INVENTION

The present invention is generally directed to a silica-based sol having a concentration of soluble silica of less than about 1000 mg $SiO_2$/l, conductivity of at least about 2.0 mS/cm and S-value below about 50%.

The present invention is also directed to a method of producing a silica-based sol which comprises:
(i) subjecting an aqueous alkali metal silicate solution to electrodialysis to form an electrodialyzed sol;
(ii) acidifying the electrodialyzed sol to form an acidified sol having a pH in the range of from about 5.0 to about 10.0.

The invention is further directed to a silica-based sol obtainable by the method according to the invention.

The invention is further directed to various uses of the silica-based sol according to the invention such as a flocculating agent, in particular as a drainage and retention aid in papermaking and as a flocculating agent for water purification.

The invention is further generally directed to a process for producing paper which comprises
(i) providing an aqueous suspension comprising cellulosic fibers;
(ii) adding to the suspension one or more drainage and retention aids comprising a silica-based sol according to the invention; and
(iii) dewatering the obtained suspension to provide a sheet or web of paper.

DETAILED DESCRIPTION OF THE INVENTION

In accordance with the present invention there is provided silica-based sols, also referred to herein as sols of silica-based particles, which are suitable for use as a flocculating agents in papermaking and water purification, in particular as a drainage and retention aids in papermaking. The term "drainage and retention aids", as used herein, refers to one or more additives which, when added to an aqueous cellulosic suspension, give better drainage and/or retention than what is obtained when not adding the said one or more additives. The silica-based sols of the invention exhibit improved drainage and retention when used in papermaking, in particular when the silica-based sols have been diluted with hard water or dilution water containing a substantial amount of salts, electrolytes, etc. Hereby the present invention makes it possible to increase the speed of the paper machine and to use a lower dosage of additive to give a corresponding drainage and retention effect, thereby leading to an improved paper making process and economic benefits.

The aqueous sol according to the invention contains silica-based particles, i.e. particles based on silica or $SiO_2$, that are preferably anionic and preferably colloidal, i.e., in the colloidal range of particle size. Aqueous dispersions of this type are usually referred to as sols. Preferably, the silica-based particles have been prepared by condensation polymerisation of siliceous compounds, e.g. silicic acids and silicates. Other elements or components may also be present in the aqueous phase of the sol and/or in the silica-based particles. Such elements or components may be present as impurities or as a result of deliberate introduction. In one embodiment of the invention, the sol contains silica-based particles which are not modified with aluminium. This means that aluminium may be present in the sol in amounts corresponding to those of impurities and then the sol usually has a molar ratio of Si:Al of higher than about 100:1 or higher than about 50:1. In another embodiment of the invention, the sol contains silica-based particles that are aluminium-modified, preferably surface-modified with aluminum. This means that aluminium is present in the sol in higher amounts. Accordingly, if modified with aluminum, the silica-based sol usually has a molar ratio of Si:Al of from about 1:1 to about 50:1 or from about 3:1 to 30:1, suitably from about 5:1 to 20:1.

The silica-based sol of this invention has a concentration of soluble silica less than about 1500 mg $SiO_2$ per liter of aqueous sol (mg $SiO_2$/l), usually less than about 1200 mg $SiO_2$/l or less than 1000 mg $SiO_2$/l, suitably less than about 800 mg $SiO_2$/l or less than about 750 mg $SiO_2$/l, and preferably less than about 700 mg $SiO_2$/l or less than about 650 mg $SiO_2$/l. The concentration of soluble silica is usually above about 100 mg $SiO_2$/l or above about 150 mg $SiO_2$/l. The concentration of soluble silica is measured and calculated as described by J. B. Mullin and J. P. Riley in Anal. Chim. Acta, vol. 12 (1955), pp. 162-176.

In the silica-based sols of this invention, the conductivity is at least about 2.0 mS/cm or at least about 2.5 mS/cm, usually at least about 2.75 mS/cm or at least about 3.0 mS/cm. Sometimes, the conductivity is at least about 4.0 mS/cm or even at least about 5.0 mS/cm. The conductivity is usually up to about 6.0 mS/cm or up to about 8.0 mS/cm, suitably up to about 10.0 mS/cm. The conductivity can be measured by means of known technique, for example using a WTW LF330 portable conductivity meter.

The silica-based particles present in the sol may be aggregated to form clusters or three dimensional networks and microgels. The S-value of a silica-based sol indicates the degree of aggregate or microgel formation and a lower S-value is indicative of a higher degree of aggregation. The silica-based sol of the invention usually has an S-value of at least about 4% or at least about 6%, suitably at least about 10% and preferably at least 15%. Usually, the S-value is up to about 50% or up to about 40%, suitably up to about 35% and preferably up to about 30%. The S-value is measured and calculated as described by R. K. Her & R. L Dalton in J. Phys. Chem. 60 (1956), 955-957.

The silica-based sol of the invention usually has a pH of at least about 5.0 or at least about 6.0, often at least about 7.0 and suitably at least about 7.5 or at least about 8.0. Usually, the pH of the silica-based sol is up to about 11.5 or up to about 11.0, suitably up to about 10.5 or up to about 10.0.

The silica-based particles present in the sol usually have a specific surface area of at least about 300 $m^2$/g or at least about 500 $m^2$/g, suitably at least about 600 $m^2$/g and preferably at least about 650 $m^2$/g. The specific surface area is usually up to 1500 $m^2$/g or at least about 1200 $m^2$/g, suitably up to about 1000 $m^2$/g or up to about 800 $m^2$/g. The specific surface area is measured by means of titration with NaOH as described by G. W. Sears, Jr. in Analytical Chemistry 28 (1956):12, 1981-1983, after appropriate removal of or adjustment for any compounds present in the sample that may disturb the titration. The specific surface areas given herein represent the average specific surface area of the silica-based particles present in a sol.

The silica-based sol of the invention usually has a silica ($SiO_2$) content in the range of from about 0.05 to about 30% by weight. Usually, the silica content is at least about 2% by weight, suitably at least about 3% by weight or at least about 4% by weight and preferably at least about 5% by weight. Usually, the silica content is up to about 30% by weight or up to about 20% by weight, suitably up to about 15% by weight and preferably up to about 10% by weight. In order to simplify shipping and reduce transportation costs, it is generally preferable to ship high concentration silica-based sols according to the invention but it is of course possible and usually preferable to dilute and mix the silica-based sols with water to substantially lower silica contents prior to use, for example to silica contents within the range of from about 0.05 to about 2% by weight or from about 0.1 to 1.5% by weight, in order to improve mixing with the furnish components. These lower silica contents are also common for diluted silica-based sol of the invention for which there is a desire to increase on-site stability.

The silica-based sol of the invention usually has a molar ratio of Si:X, where X=alkali metal, of at least about 10:1 or at least about 15:1, suitably at least about 20:1. The molar ratio is usually up to 50:1 or up to about 40:1, suitably up to about 30:1 or up to about 25:1.

The viscosity of the silica-based sol of the invention can vary depending on, for example, the silica content of the sol. Usually, the viscosity is at least about 1.1 cP or at least about 2 cP, and it may even be at least about 4 cP or at least 6 cP. Usually, the viscosity is up to about 100 cP or up to about 50 cP, suitably up to about 30 cP. The viscosity can be measured by means of known technique, for example using a Brookfield LVDV II+ viscosimeter equipped with an UL adapter.

The silica-based sol of the invention is preferably stable. Preferably, the sol maintains a specific surface area of at least about 300 $m^2$/g or at least about 500 $m^2$/g, suitably at least about 600 $m^2$/g and more preferably at least about 700 $m^2$/g for at least 1 month on storage or ageing at 20° C. in dark and non-agitated conditions.

According to the invention, the silica-based sol can be produced starting from an aqueous alkali metal silicate solution or water glass. Examples of suitable aqueous alkali metal silicates or water glasses include conventional materials, e.g. lithium, sodium and potassium silicates, preferably sodium silicate. The molar ratio of silica to alkali metal oxide, e.g. $SiO_2$ to $Na_2O$, $K_2O$ or $Li_2O$, or a mixture thereof, in the silicate solution can be in the range of from 15:1 to 1:1, suitably in the range of from 4.5:1 to 1.5:1, preferably from 3.9:1 to 2.5:1. The aqueous alkali metal silicate used usually has a $SiO_2$ content of from about 1 to about 35% by weight or from about 2 to about 20% by weight, and suitably from about 3 to about 15% by weight or from about 5 to about 10% by weight. The pH of the aqueous alkali metal silicate is usually above about 12, typically above about 13.

According to the invention, the aqueous alkali metal silicate solution is subjected to electrodialysis. This can be conducted by passing the aqueous alkali metal silicate solution through a stack comprising one or more electrodialysis cells. The electrodialysis stack comprises at least one pair of ion-selective membranes placed between at least two electrodes, so that at least three parallel compartments are formed. The ion-selective membranes can be of cationic selective and anionic selective type, and they can also be of bipolar type.

In one embodiment, several anionic selective and cationic selective membrane pairs are placed between one anode and one cathode whereby cationic membranes are placed close to the electrodes to form separate electrode compartments. Aqueous alkali metal silicate solution is fed through dilute compartments and aqueous sodium hydroxide solution is fed through concentrate compartments. A DC electric field is applied over the electrodes so that a current flows from the anode to the cathode. This current is transported by sodium and hydroxide ions in the solution in such a way that sodium ions are moving from the dilute compartments containing alkali metal silicate through the cationic selective membrane into the concentrate compartments containing sodium hydroxide, and hydroxide ions are transported through the anionic selective membranes from the dilute compartments containing alkali metal silicate solution into the concentrate compartments containing sodium hydroxide.

In another embodiment, several bipolar and cationic selective membranes are interleaved between the electrodes, with cationic selective membranes close to the two end electrodes. The bipolar membranes are preferably arranged with their cationic selective side towards the dilute compartments containing alkali metal silicate, and their anionic selective side towards the concentrate compartments containing sodium hydroxide, whereby water is transported by diffusion from both sides into the center of the bipolar membrane and split into protons and hydroxyl ions when applying a DC electric field over the electrodes. The so formed hydroxyl ions are transporting the current through the anionic selective part of the bipolar membrane into the concentrate compartments containing sodium hydroxide and the protons are transporting the current through the cationic selective part of the bipolar membrane into the dilute compartments containing alkali metal silicate.

The applied voltage and current are chosen so as to provide a suitable production rate. Preferably, the maximum voltage is chosen so that the stray currents through the manifolds are low. The current density, expressed as Amperes per meter square of projected membrane surface exposed to alkali metal silicate, is preferably kept below the limiting current density for the desired ion transport through the membranes. Usually, the current density is below about 800 $A/m^2$ or below about 600 $A/m^2$, suitably below about 300 $A/m^2$. The current density is usually above about 20 $A/m^2$ or above about 60 $A/m^2$, suitably above about 100 $A/m^2$. The temperature is usually from about 15 to about 120° C. or from about 20 to about 90° C., suitably from about 25 to about 45° C. The sodium hydroxide solution usually has a NaOH content from about 0.5 to about 15% by weight or from about 1 to about 10% by weight, suitably from about 2 to about 8% by weight. The electrodialysis can be operated in continuous or batch mode. Preferably the electrodialysis is operated in a batch mode or a combination of batch and continuous mode. Between each batch the stack may be rinsed or conditioned with e.g. sodium hydroxide solution, alkali metal silicate solution or water.

By subjecting the aqueous alkali metal silicate solution to electrodialysis, sodium and hydroxyl ions are removed therefrom so that pH of the electrodialyzed aqueous alkali metal silicate solution is usually lowered to a range of from about 6.5 to about 11.5. The intermediate product obtained by the electrodialysis process, i.e. the electrodialyzed sol, usually has a pH below about 11.5 or below about 11.0, suitably a pH below about 10.5 or below about 10.0, and pH is usually above about 6.5 or above about 7.0, suitably above about 7.5 or above about 8.0. The S-value of the intermediate silica-based sol obtained by the electrodialysis process is usually in the range of from about 60 to about 90%, or from about 65 to about 85%.

The intermediate silica-based sol obtained by the electrodialysis process is then further acidified to form an acidified sol having a pH in the range of from about 5.0 to about 10.0. The acidified sol has a pH of at least about 5.0, usually at least about 6.0, suitably at least about 6.5 or at least to about 7.0, and pH is up to about 10.0, usually up to about 9.0 and suitably up to about 8.5. The acidification can be carried out by addition of an acidifying agent. Examples of suitable acidifying agents include acids, e.g. mineral and organic acids, and other chemicals known as being suitable for acidification of alkali metal silicate solutions, e.g. ammonium sulphate and carbon dioxide. Examples of suitable mineral acids include sulphuric acid, hydrochloric acid and phosphoric acid, preferably sulphuric acid. Examples of suitable organic acids include citric acid, acetic acid and the like.

After the acidification, particle growth and/or particle aggregation of the acidified sol is suitably allowed to take place. This can be achieved by storage at room temperature during somewhat longer periods of time, a day up to about 3 to 4 days, or, preferably, by heat treatment in which periods of time and temperatures can be adjusted so that shorter periods of time are used at higher temperatures. It is possible to use fairly high temperatures during very short periods of time, but it is preferred to use lower temperatures during somewhat longer periods of time. In the heat treatment, the acidified sol can be heated at a temperature of at least about 30° C., suitably from about 30 to about 95° C. and preferably from about 35 to about 80° C. The heat treatment in usually carried out for at least about 10 minutes, suitably from about 15 to about 600 minutes or from about 20 to about 240 minutes.

In one embodiment, the acidified sol is alkalized to a pH in the range of from about 7.0 to about 11.0. The silica-based sol obtained by alkalization, i.e. the alkalized sol, has a pH of at least about 7.0, usually at least about 7.5 or at least about 8.0, suitably at least about 8.5 or at least about 9.0, and it has a pH up to about 11.0, usually up to about 10.5 or up to about 10.0, suitably up to about 9.5. The alkalization can be carried out by adding an alkaline material to the acidified sol. Examples of alkaline materials include aqueous alkali metal silicates, e.g. any of those defined above, preferably sodium silicate; aqueous alkali metal hydroxides, e.g. sodium and potassium hydroxides, preferably sodium hydroxide; ammonium hydroxide; alkaline aluminum salts, e.g. aluminates, suitably aqueous aluminates, e.g. sodium and potassium aluminates, preferably sodium aluminate. Preferably, aqueous alkali metal silicate is added, either singly or in combination with aqueous sodium aluminate. When adding aqueous alkali metal silicate and aqueous sodium aluminate, they can be added in any order, preferably the aqueous alkali metal silicate is added prior to adding the aqueous sodium aluminate. When using an aluminium salt, it is usually added in an amount to provide the molar ratio of Si:Al as defined above.

If desired, the silica-based sol obtained after alkalization can be subjected to concentration. This can be carried out in known manner such as, for example, by osmotic methods, evaporation and ultrafiltration.

In another embodiment, the acidified sol or the silica-based sol obtained by alkalization is diluted with water to lower the silica content. Dilution with water usually takes place to silica contents within the range of from about 0.05 to about 2% by weight or from about 0.1 to 1.5% by weight. Dilution with purified water usually increases the stability of the silica-based sol.

The sols of silica-based particles obtained by the method suitably have the concentration of soluble silica, conductivity, S-value, pH, silica content, molar ratio of Si:X where X is alkali metal, viscosity, stability and specific surface area as defined above.

The silica-based sol according to this invention is suitable for use as a flocculating agent, for example in the production of pulp and paper, notably as a drainage and retention aid, and within the field of water purification, both for purification of different kinds of waste water and purification specifically of white water from the pulp and paper industry. The silica-based sols can be used as a flocculating agent, notably as a drainage and retention aid, in combination with organic polymers which can be selected from anionic, amphoteric, non-ionic and cationic polymers and mixtures thereof. The use of such polymers as flocculating agents and as drainage and retention aids is well known in the art. The polymers can be derived from natural or synthetic sources, and they can be linear, branched or cross-linked. Examples of generally suitable organic polymers include anionic, amphoteric and cationic starches; anionic, amphoteric and cationic acrylamide-based polymers, including essentially linear, branched and cross-linked anionic and cationic acrylamide-based polymers; as well as cationic poly(diallyldimethyl ammonium chloride); cationic polyethylene imines; cationic polyamines; cationic polyamideamines and vinylamide-based polymers, melamine-formaldehyde and urea-formaldehyde resins. Suitably, the silica-based sols are used in combination with at least one cationic or amphoteric polymer, preferably cationic polymer. Cationic starch and cationic polyacrylamide are particularly preferred polymers and they can be used singly, together with each other or together with other polymers, e.g. other cationic and/or anionic polymers. The weight average molecular weight of the polymer is suitably above 1,000,000 and preferably above 2,000,000. The upper limit of the weight average molecular weight of the polymer is not critical; it can be about 50,000,000, usually 30,000,000 and suitably about 25,000,000. However, the weight average molecular weight of polymers derived from natural sources may be higher.

The present silica-based sol can also be used in combination with cationic coagulant(s), either with or without the co-use of the organic polymer(s) described above. Examples of suitable cationic coagulants include water-soluble organic polymeric coagulants and inorganic coagulants. The cationic coagulants can be used singly or together, i.e. a polymeric coagulant can be used in combination with an inorganic coagulant. Examples of suitable water-soluble organic polymeric cationic coagulants include cationic polyamines, polyamideamines, polyethylene imines, dicyandiamide condensation polymers and polymers of water soluble ethylenically unsaturated monomer or monomer blend which is formed of 50 to 100 mole % cationic monomer and 0 to 50 mole % other monomer. The amount of cationic monomer is usually at least 80 mole %, suitably 100 mole %. Examples of suitable ethylenically unsaturated cationic monomers include dialkylaminoalkyl (meth)-acrylates and -acrylamides, preferably in quaternised form, and diallyl dialkyl ammonium chlorides, e.g. diallyl dimethyl ammonium chloride (DADMAC), preferably homopolymers and copolymers of DADMAC. The organic polymeric cationic coagulants usually have a weight average molecular weight in the range of from 1,000 to 700,000, suitably from 10,000 to 500,000. Examples of suitable inorganic coagulants include aluminum compounds, e.g. alum and polyaluminum compounds, e.g. polyaluminum chlorides, polyaluminum sulphates, polyaluminum silicate sulphates and mixtures thereof.

The components of the drainage and retention aids according to the invention can be added to the stock, or aqueous cellulosic suspension, in conventional manner and in any order. When using drainage and retention aids comprising a silica-based sol and organic polymer, it is preferred to add the organic polymer to the stock before adding the silica-based sol, even if the opposite order of addition may be used. It is further preferred to add the organic polymer before a shear stage, which can be selected from pumping, mixing, cleaning, etc., and to add the silica-based sol after that shear stage. When using drainage and retention aids comprising a silica-based sol and anionic and cationic organic polymers, it is preferred to add the cationic organic polymer to the stock before adding the silica-based sol and anionic organic polymer. When using a cationic coagulant, it is preferably added to the cellulosic suspension before the addition of the silica-based sol, preferably also before the addition of the organic polymer(s).

The components of the drainage and retention aids according to the invention are added to the stock to be dewatered in amounts which can vary within wide limits depending on, inter alia, type and number of components, type of furnish, filler content, type of filler, point of addition, etc. Generally the components are added in amounts that give better drainage and retention than is obtained when not adding the components. The silica-based sol is usually added in an amount of at least about 0.001% by weight, often at least about 0.005% by weight, calculated as $SiO_2$ and based on dry furnish, i.e. dry cellulosic fibers and optional fillers, and the upper limit is usually about 1.0% by weight and suitably about 0.5% by weight. Each of the organic polymers is usually added in an amount of at least about 0.001% by weight, often at least about 0.005% by weight, based on dry furnish, and the upper limit is usually about 3% by weight and suitably about 1.5% by weight. When using a cationic polymeric coagulant, it can be added in an amount of at least about 0.05% by weight, based on dry furnish. Suitably, the amount is in the range of from about 0.07 to about 0.5% by weight, preferably in the range from about 0.1 to about 0.35% by weight. When using an aluminum compound as the inorganic coagulant, the total amount added is usually at least about 0.05% by weight, calculated as $Al_2O_3$ and based on dry furnish. Suit-ably the amount is in the range of from about 0.1 to about 3.0% by weight, preferably in the range from about 0.5 to about 2.0% by weight.

Further additives which are conventional in papermaking can of course be used in combination with the additives according to the invention, such as, for example, dry strength agents, wet strength agents, optical brightening agents, dyes, sizing agents like rosin-based sizing agents and cellulose-reactive sizing agents, e.g. alkyl and alkenyl ketene dimers and ketene multimers, alkyl and alkenyl succinic anhydrides, etc. The cellulosic suspension, or stock, can also contain mineral fillers of conventional types such as, for example, kaolin, china clay, titanium dioxide, gypsum, talc and natural and synthetic calcium carbonates such as chalk, ground marble and precipitated calcium carbonate.

The process of this invention is used for the production of paper. The term "paper", as used herein, of course include not only paper and the production thereof, but also other cellulosic sheet or web-like products, such as for example board and paperboard, and the production thereof. The process can be used in the production of paper from different types of suspensions of cellulose-containing fibers and the suspensions should suitably contain at least about 25% by weight and preferably at least about 50% by weight of such fibers, based on dry substance. The suspension can be based on fibers from chemical pulp such as sulphate, sulphite and organosols pulps, mechanical pulp such as thermomechanical pulp, chemo-thermomechanical pulp, refiner pulp and groundwood pulp, from both hardwood and softwood, and can also be based on recycled fibers, optionally from de-inked pulps, and mixtures thereof. The pH of the suspension, the stock, can be within the range of from about 3 to about 10. The pH is suitably above about 3.5 and preferably within the range of from about 4 to about 9.

The invention is further illustrated in the following Examples which, however, are not intended to limit the same. Parts and % relate to parts by weight and % by weight, respectively, unless otherwise stated.

EXAMPLE 1

This example illustrates preparation of silica-based sol according to the invention:

10 kg of aqueous sodium silicate solution having a $SiO_2$ content of 6.4 wt. % and molar ratio of $SiO_2$ to $Na_2O$ of 3.4 was subjected to electrodialysis. The electrodialysis was conducted by using an electrodialysis stack consisting of 10 cell pairs. The projected area of one membrane was 186 $cm^2$ and each cell pair consisted of one cation selective membrane, one anion selective membrane and 2 polymer spacers. The electrodes had dimensions of about 10 cm×50 cm and were made of platinised Nb metal. Next to each electrode, the cation selective membranes were placed. Three different streams were fed to the stack by centrifugal pumps equipped with magnetic drive at a flow rate of 100 l/h, unless otherwise stated. The sodium silicate solution was fed into dilute compartments and sodium hydroxide solution was fed into concentrate compartments and electrode compartments (10 l/h). A rectifier delivered the DC current to the stack of either constant voltage or constant current, The current was below 3.6 A and voltage was below 15 V. Electrodialysis was conducted for 7 hours and 22 minutes to provide an intermediate silicate product having a $SiO_2$ content of 7.8 wt. %, pH 9.46 and S-value of 78%.

To 900 g of the intermediate silicate product was added 47.1 g of 5% $H_2SO_4$ to lower the pH to 7.5. The obtained sample was subjected to ageing for 160 minutes at 40° C. Then 22.6 g of aqueous sodium silicate solution having a $SiO_2$ content of 23.9 wt. % and molar ratio of $SiO_2$ to $Na_2O$ of 3.4 was added. The obtained silica-based sol, designated Ex 1, had a $SiO_2$ content of 7.8 wt. %, molar ratio of $SO_2$ to $Na_2O$ of 19.1, pH of 9.5, conductivity of 6.4 mS/cm, viscosity of 7.8 cP (20° C.), soluble $SiO_2$ concentration of 557 mg $SiO_2$/l and S-value of 18%, and contained silica-based particles with a specific surface area of 740 $m^2/g$.

EXAMPLE 2

This example illustrates preparation of another silica-based sol according to the invention:

An aqueous sodium silicate solution was subjected to electrodialysis for 8 hours and 36 minutes according to the procedure of Example 1 to provide an intermediate silicate product having a $SiO_2$ content of 7.8 wt. %, pH of 9.2 and S-value of 78%.

To 900 g of the intermediate silicate product was added 36.9 g of 5% $H_2SO_4$ to lower the pH to 7.5. The obtained sample was subjected to ageing for 3 hours at 40° C. Then 24.6 g of aqueous sodium silicate solution having a $SiO_2$ content of 23.9 wt. % and molar ratio of $SiO_2$ to $Na_2O$ of 3.4 was added. The obtained silica-based sol, designated Ex. 2, had a $SiO_2$ content of 8.0 wt. %, molar ratio of $SiO_2$ to $Na_2O$ of 20.2, pH of 9.7, conductivity of 5.7 mS/cm, viscosity of 6.4 cP (20° C.), soluble $SiO_2$ concentration of 643 mg $SiO_2$/l and S-value of 20%, and contained silica-based particles with a specific surface area of 710 $m^2/g$.

EXAMPLE 3

This example illustrates preparation of another silica-based sol according to the invention:

10 kg of aqueous sodium silicate solution having a $SiO_2$ content of 6.5 wt. % and molar ratio of $SiO_2$ to $Na_2O$ of 3.3 was subjected to electrodialysis for 9 hours and 13 minutes according to the procedure of Example 1. The obtained intermediate silicate product had a $SiO_2$ content of 8.0 wt. % and pH of 8.15.

To 1000 g of the intermediate silicate product was added 3.2 g of 5% $H_2SO_4$ to lower the pH to 7.5. The obtained sample was subjected to ageing for 5 hours at 40° C. Then 12.0 g of aqueous sodium silicate solution having a $SiO_2$ content of 23.9 wt. % and molar ratio of $SiO_2$ to $Na_2O$ of 3.4 was added. The obtained silica-based sol, designated Ex. 3, had a $SiO_2$ content of 8.5 wt. %, molar ratio of $SiO_2$ to $Na_2O$ of 31.0, pH of 9.4, conductivity of 3.1 mS/cm, viscosity of 6.4 cP (20° C.) and soluble $SiO_2$ concentration of 579 mg $SiO_2$/l, and contained silica-based particles with a specific surface area of 670 $m^2/g$.

EXAMPLE 4

This example illustrates preparation of another silica-based sol according to the invention:

700 kg of aqueous sodium silicate solution having a $SiO_2$ content of 7.9 wt. % and molar ratio of $SiO_2$ to $Na_2O$ of 3.2 was subjected to electrodialysis. The electrodialysis was conducted according to the process of Example 1 except that a larger electrodialysis stack, in which the projected area of one membrane was 3200 $cm^2$, equipped with 36 membrane pairs was used.

The flow of sodium silicate solution trough the electrodialysis cell was 3600 l/hour, current was below 84 A and voltage was below 61 V. Electrodialysis was conducted for 6 hours and 30 minutes to provide an intermediate silicate product having a $SiO_2$ content of 8.5 wt. % and pH 8.9.

To 608 kg of the intermediate silicate product was added 4.6 kg of 34% $H_2SO_4$ to lower the pH to 7.8. The obtained sample was subjected to ageing for 98 minutes at 36° C. Then 16.4 kg of aqueous sodium silicate solution having a $SiO_2$ content of 22.75 wt. % and molar ratio of $SiO_2$ to $Na_2O$ of 3.4 was added. The obtained silica-based sol, designated Ex. 4, had a $SiO_2$ content of 8.8 wt. %, molar ratio of $SiO_2$ to $Na_2O$ of 21, pH of 9.3, conductivity of 5.5 mS/cm, viscosity of 7.3 cP (20° C.), soluble $SiO_2$ concentration of 590 mg $SiO_2$/l and S-value of 22%, and contained silica-based particles with a specific surface area of 760 $m^2/g$.

EXAMPLE 5

This example illustrates preparation of another silica-based sol according to the invention:

An intermediate silicate product, which had been prepared by electrodialysis of an aqueous sodium silicate solution, addition of $H_2SO_4$ and ageing according to the procedure of Example 4, was diluted ten times by addition of water. The obtained silica-based sol, designated Ex. 5, had a $SiO_2$ content of 0.8 wt. %, molar ratio of $SiO_2$ to $Na_2O$ of 35, pH of 8.9, viscosity of 1.4 cP (20° C.), and soluble $SiO_2$ concentration of 160 mg $SiO_2$/l and contained silica-based particles with a specific surface area of 780 $m^2/g$.

EXAMPLE 6

This example illustrates preparation of another silica-based sol according to the invention:

The procedure of Example 5 was repeated except that the dilution water used was hard water containing 100 ppm $Ca^{2+}$. The obtained silica-based sol, designated Ex. 6, had a $SiO_2$ content of 0.8 wt. %, molar ratio of $SiO_2$ to $Na_2O$ of 35, pH of 8.4, viscosity of 1.3 cP (20° C.) and soluble $SiO_2$ concentration of 130 mg $SiO_2$/l and contained silica-based particles with a specific surface area of 740 $m^2/g$.

EXAMPLE 7

This example illustrates preparation of another silica-based sol according to the invention:

913 kg of aqueous sodium silicate solution having a $SiO_2$ content of 9 wt. % and molar ratio of $SiO_2$ to $Na_2O$ of 3.3 was subjected to electrodialysis for 5 hours and 20 minutes according to the process of Example 4 except that an electrodialysis stack, in which the projected area of one membrane was 3200 $cm^2$, equipped with 144 membrane pairs was used. An intermediate silicate product was obtained having a $SiO_2$ content of 9.6 wt. % and pH of 9.0.

To 1500 g of the intermediate silicate product was added 15.4 g of 37% $H_2SO_4$ to lower the pH to 8.2. The obtained sample was subjected to ageing for 2 hours at 40° C. Then 4.26 g of sodium aluminate containing 24.4% $Al_2O_3$ and 18.3% $Na_2O$ was mixed with 76 g of water to form an aqueous solution. The obtained solution was then slowly added to 400 g of the above aged product.

The resulting silica-based sol had a $SiO_2$ content of 8 wt. %, molar ratio of $SiO_2$ to $Na_2O$ of 19.6, $Al_2O_3$ content of 0.23%, pH of 9.9, conductivity of 4.7 mS/cm, viscosity of 6.9 cP (20° C.) and contained silica-based particles with a specific surface area of 770 $m^2/g$.

EXAMPLE 8

Prior art silica-based sols were analyzed and used for comparison purposes in the drainage and retention performance tests of the Examples:

Ref. 1 is a silica-based sol prepared according to the general disclosure of U.S. Pat. No. 5,603,805 which had a $SiO_2$ content of 15.3 wt. %, molar ratio $SiO_2$ to $Na_2O$ of 20.7, pH of 10.7, conductivity of 5.5 mS/cm, viscosity of 7.3 cP (20° C.), S-value of 32% and soluble $SiO_2$ concentration of 2143 mg $SiO_2$/l, and contained silica-based particles with a specific surface area of 690 $m^2/g$.

Ref. 2 is a silica sol commercially available under the trade name BMA 0 of Eka Chemicals AB, Sweden, which had a $SiO_2$ content of 15.2 wt. %, molar ratio $SiO_2$ to $Na_2O$ of 40.1, pH of 10.2, conductivity of 3.4 mS/cm, viscosity of 3.1 cP (20° C.), S-value of 57% and soluble $SiO_2$ concentration of 1029 mg $SiO_2$/l, and contained silica-based particles with a specific surface area of 500 $m^2/g$.

Ref. 3 is a silica-based sol prepared according to the general disclosure of U.S. Pat. No. 5,368,833 which had a $SiO_2$ content of 7.8 wt. %, molar ratio $SiO_2$ to $Na_2O$ of 33.3, molar ratio $SiO_2$ to $Al_2O_3$ of 38, pH of 9.2, conductivity of 2.1 mS/cm, viscosity of 5.9 cP (20° C.), S-value of 23% and soluble $SiO_2$ concentration of 2571 mg $SiO_2$/l, and contained silica-based particles with a specific surface area of 810 $m^2/g$.

Ref. 4 is a silica-based sol prepared according to the general disclosure of U.S. Pat. No. 5,447,604 which had a $SiO_2$ content of 10.2 wt. %, molar ratio $SiO_2$ to $Na_2O$ of 10.9, pH of 11.1, conductivity of 10.0 mS/cm, viscosity of 3.5 cP (20° C.), S-value of 27%, turbidity of 27.1 NTU and soluble $SiO_2$ concentration of 8143 mg $SiO_2$/l, and contained silica-based particles with a specific surface area of 830 $m^2/g$.

EXAMPLE 9

Drainage performance of silica-based sols according to Examples 1 to 6 and 8 was evaluated by means of a Dynamic Drainage Analyser (DDA), available from Akribi AB, Sweden, which measures the time for draining a set volume of stock. The stock was stirred in a baffled jar at a speed of 1500 rpm throughout the test while additions of chemicals were made. A stock volume of 800 ml was drained through a wire when removing a plug and applying vacuum to that side of the wire opposite to the side on which the stock is present. Drainage performance is reported as the dewatering time (s).

The cellulosic suspension, or stock, used in this Example was based on a standard fine paper furnish consisting of 60% bleached birch and 40% of bleached pine sulfate. 30% of powder GCC (ground calcium carbonate) was added to the stock as filler. To increase the conductivity of the stock, 0.3 g/l of $Na_2SO_4 \cdot 10H_2O$ was added. Stock pH was 8.1, conductivity 1.5 mS/cm and consistency of 4.9 g/l.

In the tests, the silica-based sols were tested in conjunction with cationic starch having a degree of substitution of about 0.042 and cationic polyacrylamide (Eka PL 1510 of Eka Chemicals AB, Sweden). The additions are calculated as dry additive on dry furnish. The additions were made according to the following general sequence:
(i) adding cationic starch followed by stirring for 15 seconds;
(ii) adding cationic polyacrylamide followed by stirring for 10 seconds;
(iii) adding silica-based sol followed by stirring for 10 seconds; and
(iv) draining the stock while automatically recording the drainage time.

Table 1 shows the results at varying dosages of $SiO_2$.

TABLE 1

| Test No. | Cationic Starch [kg/t] | Cationic PAM [kg/t] | Silica-Based Sol [kg/t] | Dewatering time [s] | | |
|---|---|---|---|---|---|---|
| | | | | Ex. 1 | Ex. 2 | Ref. 1 |
| 1 | 5 | 0.75 | 0 | 19.4 | 19.4 | 19.4 |
| 2 | 5 | 0.75 | 0.3 | 12.7 | 13.8 | 15.1 |
| 3 | 5 | 0.75 | 0.6 | 8.2 | 8.4 | 9.2 |
| 4 | 5 | 0.75 | 1.2 | 6.1 | 5.9 | 6 |
| 5 | 5 | 0.75 | 1.8 | 5.3 | 5.3 | 5.5 |

EXAMPLE 10

Drainage performance was evaluated according to the general procedure of Example 9, except that a different furnish was used. The furnish used in this Example contained 50% of fibers and 50% of a pre-dispersed GCC (ground calcium carbonate) slurry, Hydrocarb 60, instead of the powder GCC. Stock pH was 8.1, conductivity 1.5 mS/cm and consistency 4.9 g/l. Table 2 shows the results at varying dosages of $SiO_2$.

TABLE 2

| Test No. | Cationic Starch [kg/t] | Cationic PAM [kg/t] | Silica-Based Sol [kg/t] | Dewatering time [s] | | |
|---|---|---|---|---|---|---|
| | | | | Ex. 1 | Ex. 2 | Ref. 1 |
| 1 | 8 | 0.75 | 0 | 27.8 | 27.8 | 27.8 |
| 2 | 8 | 0.75 | 0.3 | 23.1 | 21.8 | 24.8 |
| 3 | 8 | 0.75 | 0.6 | 12.1 | 11.7 | 12.1 |
| 4 | 8 | 0.75 | 1.2 | 7.7 | 7.6 | 7.9 |
| 5 | 8 | 0.75 | 1.8 | 6.1 | 5.9 | 6.4 |

EXAMPLE 11

Drainage performance was evaluated according to the general procedure of Example 9, except that 1 hour before addition to the stock the silica-based sols were diluted either 35 times (35×) or 50 (50×) times with hard water containing 100 ppm $Ca^{2+}$. Table 3 shows the results at varying dosages of $SiO_2$.

TABLE 3

| Test No. | Cationic Starch [kg/t] | Cationic PAM [kg/t] | Silica-Based Sol [kg/t] | Dewatering time [s] | | | |
|---|---|---|---|---|---|---|---|
| | | | | Ex. 1 35× | Ref. 1 35× | Ex. 1 50× | Ref. 1 50× |
| 1 | 5 | 0.75 | 0 | 19.5 | 19.5 | 19.5 | 19.5 |
| 2 | 5 | 0.75 | 0.3 | 14.1 | 15.7 | 14.1 | 18.9 |
| 3 | 5 | 0.75 | 0.6 | 8.5 | 9.3 | 8.5 | 17.8 |
| 4 | 5 | 0.75 | 1.2 | 5.5 | 6.5 | 6.1 | 16.0 |
| 5 | 5 | 0.75 | 1.8 | 5.4 | 5.7 | 5.1 | 13.5 |

EXAMPLE 12

Drainage performance was evaluated according to the general procedure of Example 11, except that a different silica-based sol according to the invention was tested. Table 4 shows the results at varying dosages of $SiO_2$.

TABLE 4

| Test No. | Cationic Starch [kg/t] | Cationic PAM [kg/t] | Silica-Based Sol [kg/t] | Dewatering time [s] | | | |
|---|---|---|---|---|---|---|---|
| | | | | Ex. 3 35× | Ref. 1 35× | Ex. 3 50× | Ref. 1 50× |
| 1 | 5 | 0.75 | 0 | 18.9 | 18.9 | 18.9 | 18.9 |
| 2 | 5 | 0.75 | 0.3 | 12.7 | 13.4 | 12.3 | 16.7 |
| 3 | 5 | 0.75 | 0.6 | 8.3 | 8.8 | 8.1 | 13.6 |
| 4 | 5 | 0.75 | 1.2 | 6.2 | 6.4 | 5.5 | 8.3 |
| 5 | 5 | 0.75 | 1.8 | 5.3 | 5.5 | 5.4 | 6.3 |

EXAMPLE 13

Drainage performance was evaluated according to the general procedure of Example 9, except that different silica-based sols according to the invention were tested and that 1 hour before addition to the stock the silica-based sols Ref. 1 and Ex. 4 were diluted 35 times (35×) with hard water containing 100 ppm $Ca^{2+}$. The silica-based sols Ex. 5 and Ex. 6 were used without any further dilution, i.e. as being prepared, at silica content of 0.8 wt. %. Table 5 shows the results at varying dosages of $SiO_2$.

TABLE 5

| Test No. | Cationic Starch [kg/t] | Cationic PAM [kg/t] | Silica-Based Sol [kg/t] | Dewatering time [s] | | | |
|---|---|---|---|---|---|---|---|
| | | | | Ex. 4 35× | Ex. 5 | Ex. 6 | Ref. 1 35× |
| 1 | 5 | 0.75 | 0 | 21.7 | 21.7 | 21.7 | 21.7 |
| 2 | 5 | 0.75 | 0.2 | 15.2 | 15.3 | 15.5 | 17.1 |
| 3 | 5 | 0.75 | 0.4 | 10.8 | 11.0 | 10.8 | 11.9 |
| 4 | 5 | 0.75 | 0.7 | 8.3 | 8.5 | 8.5 | 9.9 |
| 5 | 5 | 0.75 | 1.0 | 7.4 | 7.0 | 7.5 | 8.2 |

EXAMPLE 14

In the following tests, retention performance of silica-based sols according to Examples 1 to 6 and 8 was evaluated.

The retention performance was evaluated by means of a Dynamic Drainage Jar (DDJ), available from Paper Research Materials Inc., which measures the fines retention when draining a set volume of stock. The stock was stirred in a baffled jar at a speed of 1200 rpm throughout the test. A stock volume of 500 ml was used and additions of chemicals were made. The stock was drained through a wire when opening a tube clamp, the tube connected to an opening in the bottom of the jar below the wire. The drainage was collected in a beaker during 30 seconds at a flow rate partly set by the size of a tip opening connected to the tube. Flow rate was approximately 130-160 ml/min. The amount of dry material in the beaker was determined by evaporation at 105° C. in an oven. The total fines fraction was determined separately. The results were reported as fines retention (%).

The stock, chemicals and additions according to Example 9 were similarly applied in this Example. Table 6 shows the results at varying dosages of $SiO_2$.

TABLE 6

| Test No. | Cationic Starch [kg/t] | Cationic PAM [kg/t] | Silica-Based Sol [kg/t] | Retention [%] | | |
|---|---|---|---|---|---|---|
| | | | | Ex. 1 | Ex. 2 | Ref. 1 |
| 1 | 5 | 0.75 | 0 | 30 | 30 | 30 |
| 2 | 5 | 0.75 | 0.5 | 39 | 37 | 31 |
| 3 | 5 | 0.75 | 1 | 50 | 54 | 45 |
| 4 | 5 | 0.75 | 1.5 | 57 | 58 | 54 |
| 5 | 5 | 0.75 | 2 | 59 | 59 | 56 |

EXAMPLE 15

Retention performance was evaluated according to the general procedure of Example 14, except that 1 hour before addition to the stock the silica-based sols were diluted 35 times (35×) with hard water containing 100 ppm $Ca^{2+}$. Table 7 shows the results at varying dosages of $SiO_2$.

TABLE 7

| Test No. | Cationic Starch [kg/t] | Cationic PAM [kg/t] | Silica-Based Sol [kg/t] | Retention [%] | | |
|---|---|---|---|---|---|---|
| | | | | Ex. 1 35× | Ex. 2 35× | Ref. 1 35× |
| 1 | 5 | 0.75 | 0 | 33 | 33 | 33 |
| 2 | 5 | 0.75 | 0.5 | 51 | 54 | 47 |
| 3 | 5 | 0.75 | 1 | 55 | 57 | 55 |
| 4 | 5 | 0.75 | 1.5 | 58 | 60 | 58 |
| 5 | 5 | 0.75 | 2 | 59 | 59 | 59 |

EXAMPLE 16

Retention performance was evaluated according to the general procedure of Example 14, except that different silica-based sols according to the invention were tested and that 1 hour before addition to the stock the silica-based sols Ref. 1 and Ex. 4 were diluted 35 times (35×) with hard water containing 100 ppm $Ca^{2+}$. The silica-based sols Ex. 5 and Ex. 6 were used without any further dilution, i.e. as being prepared, at silica content of 0.8 wt. %. Table 8 shows the results at varying dosages of $SiO_2$.

TABLE 8

| Test No. | Cationic Starch [kg/t] | Cationic PAM [kg/t] | Silica-Based Sol [kg/t] | Retention [%] | | | |
|---|---|---|---|---|---|---|---|
| | | | | Ex. 4 35× | Ex. 5 | Ex. 6 | Ref. 1 35× |
| 1 | 5 | 0.75 | 0 | 31 | 31 | 31 | 31 |
| 2 | 5 | 0.75 | 0.5 | 44 | 40 | 40 | 38 |
| 3 | 5 | 0.75 | 1 | 58 | 58 | 54 | 51 |
| 4 | 5 | 0.75 | 1.5 | 61 | 59 | 59 | 58 |
| 5 | 5 | 0.75 | 2 | 61 | 61 | 61 | 60 |

The invention claimed is:

1. A silica-based sol having an $SiO_2$, content of at least about 3% by weight, a concentration of soluble silica of less than about 800 mg $SiO_2/l$, conductivity of at least about 2.0 mS/cm and S-value below about 50%.

2. The silica-based sol according to claim 1, wherein the concentration of soluble silica is less than about 750 mg $SiO_2/l$.

3. The silica-based sol according to claim 1, wherein the sol has a conductivity of at least about 2.5 mS/cm.

4. The silica-based sol according to claim 1, wherein the sol has an S-value within the range of from about 8 to about 30%.

5. The silica-based sol according to claim 1, wherein the sol contains silica-based particles having a specific surface area of at least about 300 m²/g.

6. The silica-based sol according to claim 1, wherein the sol contains silica-based particles that are not modified with aluminium.

7. The silica-based sol according to claim 1, wherein the sol has a $SiO_2$ content of at least about 4% by weight.

8. The silica-based sol according to claim 2, wherein the sol has a conductivity of at least about 2.5 mS/cm.

9. The silica-based sol according to claim 3, wherein the sol has an S-value within the range of from about 8 to about 30%.

10. The silica-based sol according to claim 8, wherein the sol has an S-value within the range of from about 8 to about 30%.

11. The silica-based sol according to claim 4, wherein the sol contains silica-based particles having a specific surface area of at least about 300 m²/g.

12. The silica-based sol according to claim 5, wherein the sol has a $SiO_2$ content of at least about 4% by weight.

13. A flocculating agent comprising the silica-based sol according to claim 1.

14. A process for producing paper comprising:
   (i) providing an aqueous suspension comprising cellulosic fibres;
   (ii) adding to the suspension one or more draining and retention aids comprising a silica-based sol according to claim 1; and
   (iii) dewatering the obtained suspension to provide a sheet or web of paper.

15. The process according to claim 14, wherein said one or more drainage and retention aids comprise a cationic starch or a cationic synthetic polymer.

* * * * *